(No Model.)

L. GWINNER.
CASTER.

No. 456,305. Patented July 21, 1891.

WITNESSES.
Frank E. Brandt
J. W. Sloneker

INVENTOR.
Lewis Gwinner.
by Robert S. Carr
ATTORNEY.

UNITED STATES PATENT OFFICE.

LEWIS GWINNER, OF HAMILTON, OHIO.

CASTER.

SPECIFICATION forming part of Letters Patent No. 456,305, dated July 21, 1891.

Application filed March 19, 1891. Serial No. 385,588. (No model.)

*To all whom it may concern:*

Be it known that I, LEWIS GWINNER, of Hamilton, Butler county, Ohio, have invented certain new and useful Improvements in Casters, of which the following is a specification.

My invention relates to truck or furniture casters of that class having two floor-wheels and pivoted to a stem to rotate and oscillate thereon; and the objects of my improvements are to simplify the construction of parts, to distribute the weight to make the caster noiseless, and to reduce friction of the anti-friction wheel. I attain these objects in the following-described manner, illustrated in the accompanying drawings, in which—

Figures 1, 2:
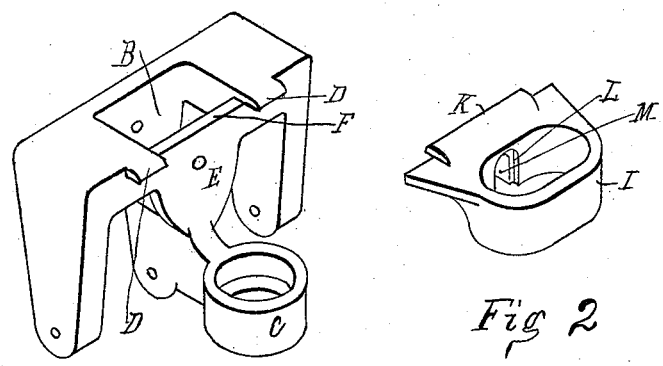
Figures 3, 4:
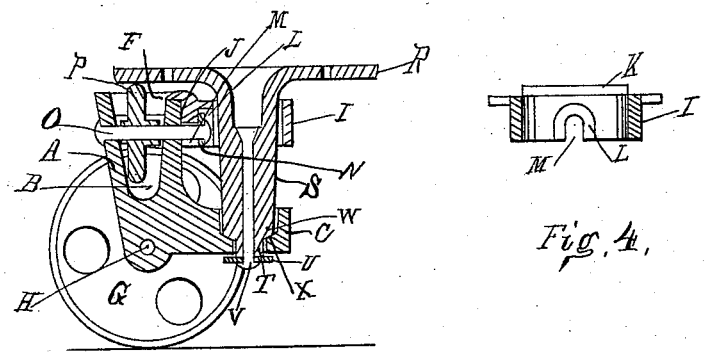

Figure 1 is a perspective view of the housing; Fig. 2, a perspective view of the keeper; Fig. 3, a diametrical transverse vertical section of the caster; Fig. 4, a sectional elevation of the keeper through the center of the slot.

In the drawings, A represents the frame or housing of the caster constructed with central chamber B, projecting foot C, lugs D, and plane front face E, notched at F, between and in line with the bottom of said lugs; G, two floor-wheels supporting the housing by axle H; I, a keeper or yoke constructed with an oblong slot or opening, a plane rear face J, lug K, recess L, and gap M. Washer N is used with rivet O to fasten said keeper to the housing. An anti-friction wheel P is journaled on rivet O in chamber B. Plate R is constructed with a plane circular track underneath for wheel P, and a vertical center stem or pin S, depending through the slot in keeper I, pivoted on circular concave step X by convex shoulder W and terminating in reduced extension T, through an opening in foot C, to be retained by washer U and rivet V. Housing A and keeper I are constructed separately and interlocked together face to face by lugs D, extending over a portion of the top surface of the keeper and lug K, entering the notch at F in the housing, where they are fastened by rivet O and washer N.

Wheel P has a narrow or semicircular face to lessen the friction on plate R, and is placed in rear of a perpendicular passing through axle H to cause said axle to act as a fulcrum to lift foot C and retain it in contact with shoulder W to receive its portion of the weight and obviate noise during use. Shoulder W and step X let the caster turn on pin S and oscillate thereon to the extent of the slot in keeper I, that the floor-wheels may adapt themselves to uneven surfaces. Pin S may terminate with shoulder W and extension T be integral with washer U, or may extend through said washer and be riveted to dispense with rivet V, or a set-screw may displace said rivet. Plate R may be of any desired form, or may be dispensed with entirely, together with wheel P, when pin S will operate against the inside of the slot in keeper I. Said keeper extends so little forward of pin S that the screw-holes through plate R are easily accessible even when located near its center.

I am aware that prior to my invention casters with two floor-wheels and an anti-friction wheel have been used and patented. I do not therefore claim such a combination, broadly; but in the present state of the art What I do claim as my invention, and desire to secure by Letters Patent, is—

A caster having in combination a housing supported on floor-wheels by an axle, a circular opening through a foot projecting therefrom, an annular concave step formed on the inside of said opening, a stem fitted for attachment to furniture, extending through said opening and retained by a washer fastened on the end thereof, a convex circular shoulder formed around said stem to pivot on said step, and a keeper for said stem riveted to said housing.

LEWIS GWINNER.

Witnesses:
FRANK E. BRANDT,
ROBERT S. CARR.